United States Patent
Martin Armani

(10) Patent No.: US 8,094,987 B2
(45) Date of Patent: Jan. 10, 2012

(54) SILICA-ON-SILICON WAVEGUIDES AND RELATED FABRICATION METHODS

(75) Inventor: Andrea Martin Armani, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/033,391

(22) Filed: Feb. 23, 2011

(65) Prior Publication Data

US 2011/0138860 A1 Jun. 16, 2011

Related U.S. Application Data

(62) Division of application No. 12/436,935, filed on May 7, 2009.

(60) Provisional application No. 61/128,172, filed on May 19, 2008.

(51) Int. Cl.
*G02B 6/10* (2006.01)

(52) U.S. Cl. ........................................ 385/129

(58) Field of Classification Search ................ None
See application file for complete search history.

(56) References Cited

U.S. PATENT DOCUMENTS

| | | | |
|---|---|---|---|
| 6,044,192 A * | 3/2000 | Grant et al. | 385/129 |
| 6,895,133 B1 * | 5/2005 | Calkins et al. | 385/14 |
| 8,045,834 B2 | 10/2011 | Painter et al. | |
| 2005/0169331 A1 * | 8/2005 | Vahala et al. | 372/39 |
| 2007/0230856 A1 * | 10/2007 | Yamazaki | 385/5 |

OTHER PUBLICATIONS

Syms et al., "Reflow and Burial of Channel Waveguides Formed in Sol-Gel Glass on Si Substrates", Sep. 1993, IEEE Photonics Technology Letters, vol. 5, No. 9, 1077-1079.*
Poulsen et al., "Advances in silica-based integrated optics", Oct. 2003, Opt. Eng., vol. 42, 2821-2834.*
Restriction Requirement issued for U.S. Appl. No. 12/436,935, filed on May 7, 2009 in the name of Andrea Martin Armani mail date: Dec. 29, 2010.
Non-Final Office Action issued for U.S. Appl. No. 12/436,935, filed on May 7, 2009 in the name of Andrea Martin Armani mail date: May 3, 2011.
Notice of Allowance issued for U.S. Appl. No. 12/436,935, filed on May 7, 2009 in the name of Andrea Martin Armani mail date: Jul. 26, 2011.

* cited by examiner

*Primary Examiner* — Sung Pak
(74) *Attorney, Agent, or Firm* — Steinfl & Bruno, LLP

(57) ABSTRACT

True time delay silica waveguides and related fabrication methods are disclosed. Also disclosed are true time delay silica waveguides comprising wedged silica structures.

9 Claims, 5 Drawing Sheets

| Width | Pitch | Length | Rotations | Footprint | Delay |
|---|---|---|---|---|---|
| (um) | (um) | (m) | | (cm^2) | (ns) |
| 8 | 20 | 21 | 580 | 5 | 102 |
| 8 | 20 | 52 | 910 | 13 | 251 |
| 4 | 7 | 104 | 2170 | 9 | 501 |

SILICA-ON-SILICON WAVEGUIDES AND RELATED FABRICATION METHODS

CROSS REFERENCE TO RELATED APPLICATIONS

This application is a US Divisional Application of US Non-Provisional application Ser. No. 12/436,935 filed on May 7, 2009 which, in turn, claims priority to US provisional application Ser. No. 61/128,172 filed on May 19, 2008 and US provisional application Ser. No. 61/128,552 filed on May 22, 2008, the contents of all of which are incorporated herein by reference in their entirety.

FIELD

The present disclosure relates to waveguides and methods to fabricate waveguides. More in particular, it relates to silica-on-silicon waveguides and methods to fabricate silica-on-silicon waveguides.

BACKGROUND

There are a range of applications in which creation of true time delay is desired. True time delay refers to delays realized by actual propagation of light through a waveguide of length necessary to realize a specific transit time (the delay time) as opposed to a delay realized, for example, by recirculation of light through a closed path, such as in a resonator. These applications include the creation of synthetic filters and also applications in biodetection. While optical fiber waveguides can provide the largest possible delays, these devices suffer from being a filamentary structure that is neither compact in size nor can be readily fabricated into precise lengths having micron precision.

A semiconductor-based approach that uses precision lithography to form waveguides on a chip is highly desirable for true time delay devices. According to such approach, time delays can be precisely controlled through lithography and the economics of scale provided by chip-based processing can lower the cost of production. Furthermore, such chip-based, optical delays can be integrated with other optical and/or electronic devices.

However, current technology for creating such chip-based waveguides results in waveguides that have optical losses many orders of magnitude higher than for optical fiber waveguides. As a result, the corresponding time delays possible using these structures are many orders smaller in comparison to what is now possible using optical fibers.

SUMMARY

According to a first aspect of the present disclosure, a silica waveguide is provided, comprising: a first silica waveguide structure; a second silica waveguide structure; a silica separation strip separating the first silica waveguide structure from the second silica waveguide structure; and a silicon pillar supporting the first silica waveguide structure, the second silica waveguide structure, and the silica separation strip.

According to a second aspect of the present disclosure, a method for fabricating a silica waveguide is provided, comprising: defining a substantially polygonal silica pad on a silicon substrate; performing a laser silica reflow process on the silica pad; and, after that, cleaving at least one of the sides of the silica pad to define two non-resonant waveguide structures.

According to a third aspect of the present disclosure, a silica waveguide having a substantially curved shape is provided, comprising: a first curved waveguide; a second curved waveguide; and a transition section connecting the first curved waveguide with the second curved waveguide, wherein the first curved waveguide, second curved waveguide, and transition section are wedged silica structures forming a non-resonant silica waveguide.

Further aspects of the present disclosure are provided in the specification, drawings and claims of the present application.

The devices and methods according to the present disclosure provide several embodiments of creating ultra-low-loss waveguides on a chip with optical losses that approach what is possible through the use of optical fibers.

The methods and devices of the present disclosure extend the possible applications to include not only true time delay devices that, unlike optical resonators, function over a continuous range of wavelengths (not simply at precise resonant values), but also enables end-fire-coupling (i.e. when two waveguides are butted up against one another) into more conventional chip-based waveguides. Such feature is not possible in optical resonators, as it destroys the condition of resonance. However, it is an important ingredient to create practical devices based upon true time delay.

DETAILED DESCRIPTION

Figure 1A:
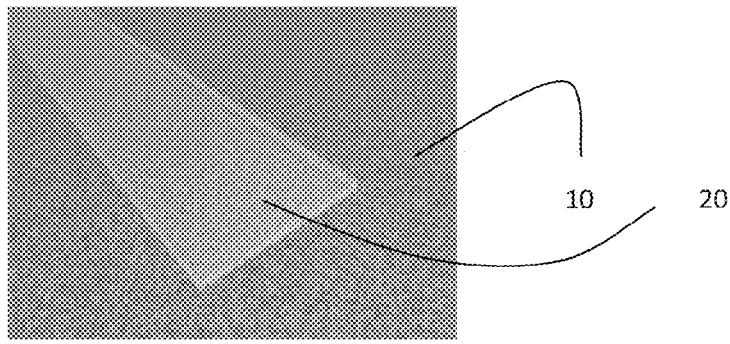
FIGS. 1A-1C show fabrication steps in accordance with an embodiment of the present disclosure.
Figure 1B:
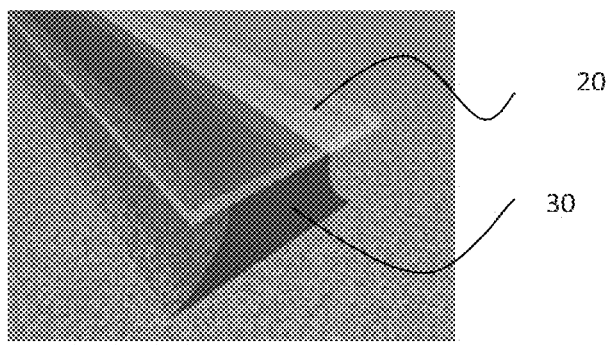
Figure 1C:
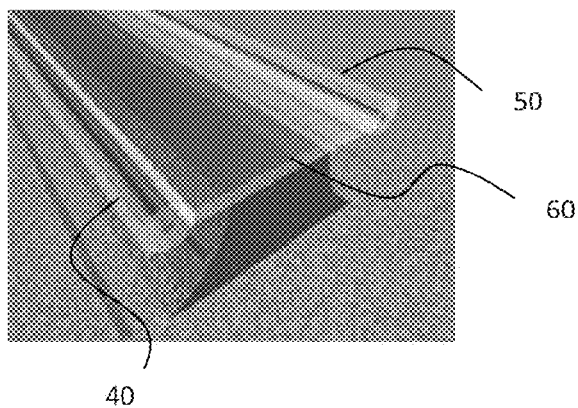

FIGS. 1A-1C show fabrication steps of a waveguide in accordance with an embodiment of the present disclosure.

FIG. 1A shows a silicon (Si) substrate (10) on which a rectangular silica ($SiO_2$) pad (20) is defined. By way of example and not of limitation, definition of pad (20) can be a lithographic definition. While the embodiment of FIG. 1 shows a rectangular pad, other geometries and shapes can be provided such as square, rectangular with curved corners and, more generally, X-sided geometries (where X>2).

FIG. 1B shows formation of a pillar (30) under pad (20) through an etching process using $XeF_2$ (Xenon difluoride) isotropic etchant. Use of different etchants is possible, e.g., Heated Potassium Hydroxide (KOH).

FIG. 1C shows formation of a rectangular slab comprising a first silica waveguide structure (40), a second silica waveguide structure (50) and a silica separation strip (60), separating first structure (40) from second structure (50). According to the embodiment shown in FIG. 1C, the two waveguide structures are obtained through a silica reflow process using $CO_2$ laser. Silica reflow process is known, for example, from Armani, D. K., Kippenberg, T. J., Spillane, S. M. & Vahala, K. J., *Ultra-high-Q toroid microcavity on a chip*, Nature 421, 925-928 (2003). See also Gorodetsky, M.

L., Savchenkov, A. A. & Ilchenko, V. S. *Ultimate Q of optical microsphere resonators*, Optics Letters 21, 453-455 (1996) or Vernooy, D. W., Ilchenko, V. S., Mabuchi, H., Streed, E. W. & Kimble, H. J. *High-Q measurements of fused-silica microspheres in the near infrared*, Optics Letters 23, 247-249 (1998).

With continued reference to the embodiment of FIG. 1C, instead of a short $CO_2$ laser pulse used to reflow the disk into a toroid like in known fabrication methods of microdisk resonators, a shaped, continuous exposure is adopted and scanned over the structure of FIG. 1B to obtain the structure of FIG. 1C. Shaping allows one to increase the uniformity of the exposure to the waveguide. Several shaping methods can be used, such as integrating focusing lenses with the beam path (point and cylindrical) and integrating blocking elements (gratings).

Scanning can occur either by moving the slab through the laser beam, or by moving the laser beam. Movement of the slab through the laser beam is different from known silica reflow methods, where the sample is completely stationary through the entire process. Movement of the sample through the laser beam can be obtained through motorized stages. One possible type of stage to be used with the present disclosure is a stepper stage. A wide range of scan rates can be used, e.g., mm/s to cm/s. Power is balanced with scan rate, meaning that higher power requires faster scan rate and lower power requires slower scan rate. By way of example, 5-15 W focused to an about 200 µm spot size can be used, and values upwards of 35 W are also possible.

The laser-driven silica reflow process can also be an automated process, according to which the structure of FIG. 1B is uniformly (spatially and temporally) driven through the laser beam. According to a further embodiment of the present disclosure, it is also possible to reflow arrays of waveguides simultaneously by creating multiple laser beams. One method of doing so would be to use holographic diffraction optics.

The two waveguide structures (40), (50) of FIG. 1C can be two unique waveguides, if both ends of the separation strip (60) are cleaved. Cleaving can occur, for example, by way of a dicing saw or even a diamond scribe. Alternatively, waveguide structures (40) and (50) can represent a continuous waveguide, where the input of the second waveguide is adjacent to the output of the first waveguide or vice versa.

Figure 2:
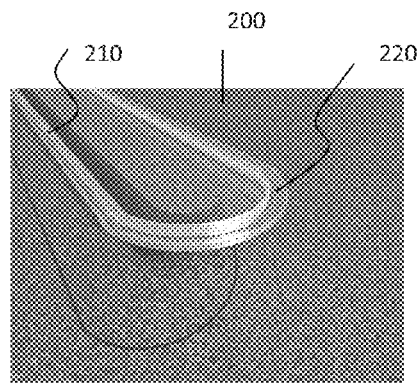
FIG. 2 shows a silica waveguide in accordance with an embodiment of the disclosure.

FIG. 2 shows an example of a continuous waveguide (200), where the light traveling along arm (210) continues to travel along arm (220).

Figure 3:
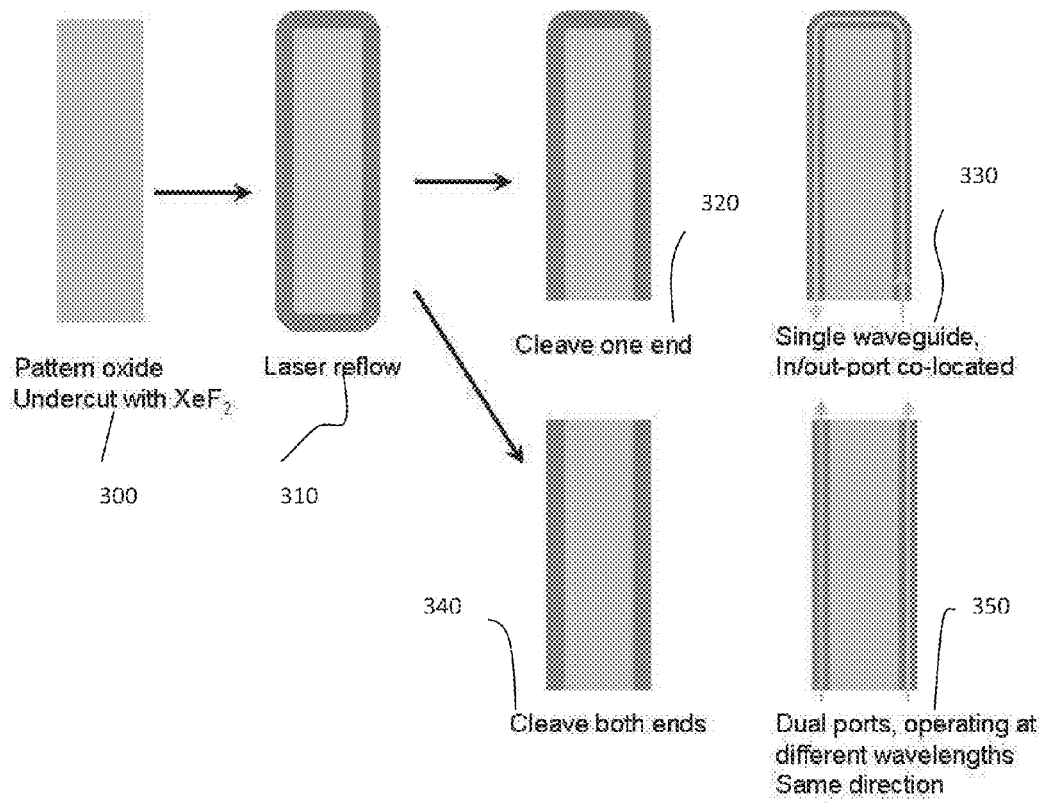
FIG. 3 shows process steps to fabricate two different embodiments of silica waveguide structures.

FIG. 3 shows a cleaving process in accordance with an embodiment of the present disclosure. A rectangular silica pad is patterned in step (300), and a laser silica reflow process is performed in step (310). Two different embodiments are now possible. According to a first embodiment, only one end is cleaved in step (320) and a single waveguide is obtained in step (330), similarly to the embodiment shown in FIG. 2. As also shown in step (330) of FIG. 3, the input and output ports of the waveguide shown in the figures can be co-located. According to a second embodiment, both ends are cleaved in step (340), and two waveguides, possibly operating at different wavelengths, are obtained in step (350).

Figure 4:
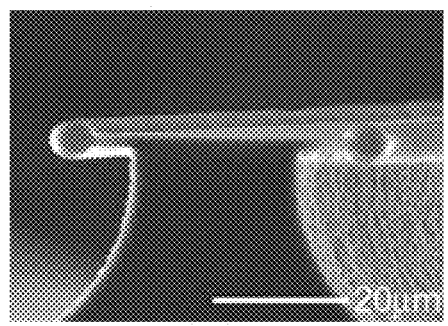
FIG. 4 is a photograph showing a perspective view of a silica waveguide.

FIG. 4 shows a SEM (scanning electron micrograph) image of a waveguide fabricated in accordance with the steps of FIGS. 1A-1C.

The waveguide structures (40), (50) can be embedded into a secondary material cladding at the end of the fabrication process to improve the optical field confinement. Example materials can be polymers or silica-based sol-gel.

The diameter of waveguide structures (40), (50) is a uniform diameter. In order to obtain a uniform diameter, the following process parameters are controlled: 1) lithography (controlled in order to be free from micron-scale or greater defects), 2) xenon difloride etcher (controlled in order to perform the undercut uniformly in all directions), 3) scan rate during reflow (controlled to be constant), 4) $CO_2$ laser power (controlled to be uniform over the surface of the waveguide).

Straight waveguides will tend to be leaky due to coupling into modes of the non-reflowed material. This leakage can be reduced by judicious choice of the initial planar material thickness, so as to substantially confine the optical mode to the circular cross-section (reflowed) waveguide region. As noted in the following embodiment, however, this requirement can be dispensed with through introduction of curvature into the structure in the form of a spiral structure. Such curvature forces the optical mode onto the outer boundary of the reflowed region, preventing leakage into the interior planar region.

In particular, according to a further embodiment of the present disclosure, the waveguide of FIG. 1C and FIG. 4 is a serpentine waveguide having a radius of curvature that can be optimized to minimize loss. Such minimization can be obtained, for example, through finite element method simulations. According to an example of realization, using a serpentine configuration with a minimum radius of curvature of 10 microns, it is possible to pattern 100 meters of the waveguide on a 10 $cm^2$ wafer, to achieve a delay in excess of 100 ns. The laser can be a tunable laser centered at 1550 nm. The introduction of curvature by way, e.g., of a serpentine structure, can also relax the requirement of material thickness, as noted above.

Figure 5:
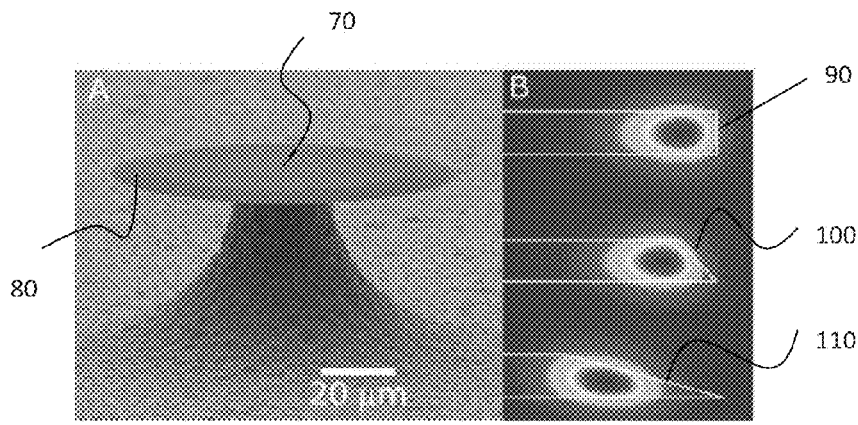
FIG. 5 shows a microdisk with a wedge structure.

FIG. 5 shows a known arrangement (see T. J. Kippenberg, J. Kalkman, A. Polman, and K. J. Vahala, *Physical Review A*, Volume 74, 051802 (2006)) of a silica microdisk (70) comprising a wedge structure (80) at its boundary. Three different wedge angles (90), (100), (110) are shown in inset B of FIG. 5.

Differently from what is shown in the previous FIGS. 1A-1C, the wedge structure of FIG. 5 does not rely upon silica reflow, and uses only conventional lithographic and processing methods for its fabrication. Formation of the wedge at the boundary of the microdisk involves adjusting the etch chemistry and has a beneficial effect on waveguide loss. However, the above Kippenberg et al paper is limited to resonator structures.

As mentioned above, differently from a silica reflow process, wedge geometry is completely defined through lithography. As such, placement on a chip of a wedge structure and its relative location of other components and waveguides can be well controlled during fabrication. This enables incorporation of coupling waveguides, taps and so forth using conventional processing tools and methods.

Figures 6, 7:
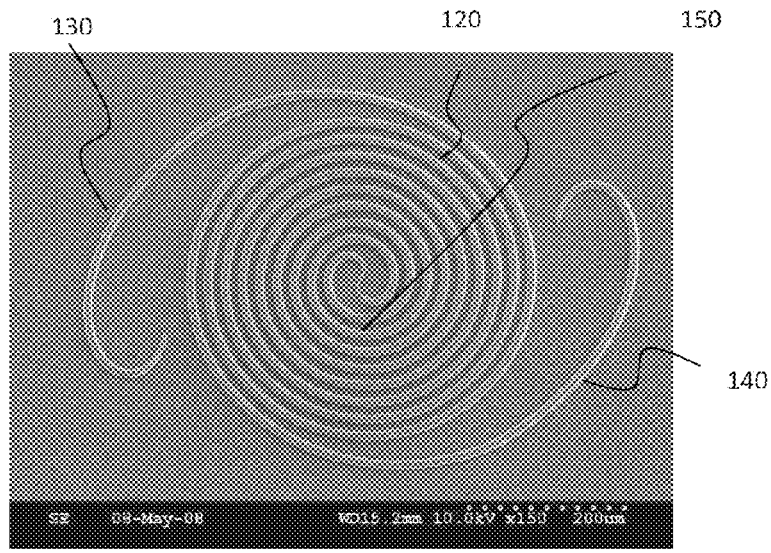
FIG. 6 shows a spiral waveguide with a wedge structure.
FIG. 7 shows a table with different design parameters for the spiral waveguide of FIG. 6.

According to a further embodiment of the present disclosure, silica waveguides having a wedge structure are disclosed. An example of this further embodiment is shown in FIG. 6, where a spiral non-resonant (i.e., true time delay) waveguide structure (120) is shown. Differently from known spiral waveguide structures, structure (120) of FIG. 6 is based on a wedge geometry to carry light around the spiral. Spiral wedge waveguides can provide a multi-order of magnitude reduction in optical loss as compared to conventional optical waveguides. While retaining all of the benefits known from prior work on disk resonators, the spiral wedge devices according to the present disclosure are non-resonant (true time delay) and can also be end-fire coupled into conventional waveguides on a semiconductor chip through devices such as adiabatic couplers. Such features are relevant for creation of true time delay, and neither can be realized in the currently known disk resonator structure.

In the embodiment of FIG. 6, structure (120) comprises a first spiral (130) and a second spiral (140). First spiral (130) brings light from the exterior to the interior of the structure. Second spiral (140) returns the light to the exterior. In order to compensate for lack of optical confinement on the non-wedge side of the waveguide, the wedge structure is spirally shaped so that curvature (also known as whispering gallery guidance) can provide the missing optical confinement on the non-wedge side. Optical coupling to both the incoming and outgoing spiral waveguide occurs at the exterior of the spiral structure (120) through, e.g., fiber tapers or integrated adiabatic couplers. Although not illustrated in FIG. 6, this coupling can be to conventional waveguides since the spiral (120) itself is lithographically designed. According to an embodiment of the present disclosure, integrated adiabatic couplers are used. Such structures are non-resonant and can be fabricated using standard, semiconductor processing methods.

At the center of the spiral (120), a special waveguide structure (150) is located which enables transition between the two spirals. Specifically, this transition couples light from the inward spiral (130) to the outward spiral (140). Applicants' simulations have demonstrated that proper design of this transition structure can produce a negligible optical loss. According to an embodiment of the present disclosure, the transition structure links together the two whispering gallery wedge waveguides (130), (140) at an inflection point such that the overall insertion loss is less than 0.1 dB. To accomplish this, an embodiment of the present disclosure involves adiabatic transition from the incoming wedge into a single-mode waveguide followed by adiabatic transition into the outgoing whispering gallery wedge waveguide. The inflection point occurs in the single mode waveguide section. Due to the very low loss of the transition region, the time delay possible in the embodiment of FIG. 3 is entirely set by the wedge structure loss. The table of FIG. 7 shows exemplar spiral sizes and delays that can be obtained with the embodiment of FIG. 6.

The wedge structure of the embodiment of FIG. 6 is a non-embedded structure, i.e. a silica-air wedge. A further embodiment of the present disclosure is related to embedded wedge waveguides, where the wedge is embedded into a material having an index higher than air, but lower than the index of the spiral material. In this way, further reduction in loss can be obtained through reduction of the index contrast between the spiral and the surrounding medium (which tends to lower the interface scattering loss). Although such reduction will provide a higher lower bound on the turning radius, a design trade-off can be obtained. Moreover, in addition to the potentially lower scattering loss relative to that of the silica-air wedge waveguides, the embedded wedge waveguides allow for a slightly different waveguide design due to the lower index bottom cladding.

In particular, the waveguide in the embedded structures can be a flattened triangular shape guiding light on both sides of the wedged triangle, thus eliminating the need for whispering-gallery guiding (curvature) on one side of the wedge as in the air-silica designs.

Figure 8:
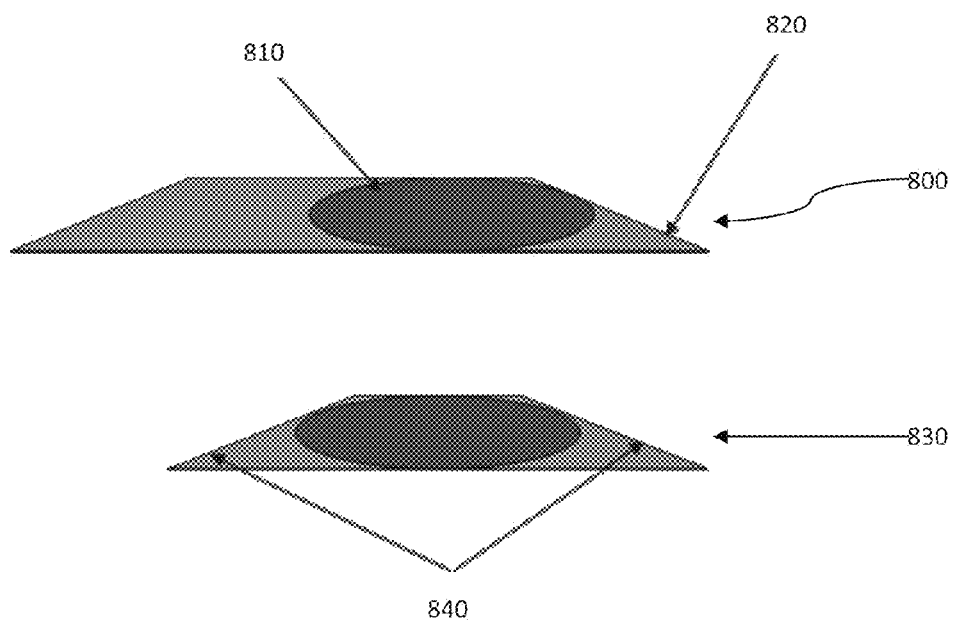
FIG. 8 shows a double wedge embodiment of the present disclosure.

As shown in FIG. 8, waveguide structure (800) contains a wedge (820) only partially confining optical mode (810). On the other hand, wedges (840) of waveguide (830) both confine the optical mode. This additional design flexibility can further aid in lowering the optical loss (by pushing the field away from the "rough" interior edges), in the layout of the time delay waveguide pattern, and in the design of evanescent coupling between different vertical layers (which the embedded structure naturally allows for). Such vertical coupling can allow for layering of spiral structures to effectively multiply the amount of time delay in a given area of the semiconductor chip.

In summary, the present disclosure is directed to non-resonant (i.e., true-time-delay) devices. These devices operate over the entire optical transmission window of silica. By way of example, a possible operation band can be the 1500 nm telecom band. In addition to the ultra-low loss characteristics of the proposed waveguides, silica is one of the best materials available with reference to linearity, and the waveguides according to the present disclosure support stable polarization states, both of which are relevant in true time delay applications.

Accordingly, what have been shown are silica-on-silicon waveguides and related fabrication methods. While such waveguides and fabrication methods have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

The invention claimed is:

1. A method for fabricating a silica waveguide, comprising:
    defining a substantially polygonal silica pad on a silicon substrate;
    forming a pillar under the silica pad, thus suspending the silica pad on the silicon substrate;
    performing a laser silica reflow process on the suspended silica pad; and, after that,
    cleaving at least one of the sides of the suspended silica pad to define at least one non-resonant waveguide structure with a substantially circular cross section.

2. The method of claim 1, wherein the performing the laser silica reflow process on the suspended silica pad defines a substantially ovally shaped silica pad, and wherein cleaving at least one of the sides of the suspended silica pad comprises cleaving one side of the suspended silica pad to define a single, substantially C-shaped, waveguide structure with a substantially circular cross section.

3. The method of claim 1, wherein the performing the laser silica reflow process on the suspended silica pad defines a substantially ovally shaped silica pad, and wherein cleaving at least one of the sides of the suspended silica pad comprises cleaving two sides of the silica pad to define two separate waveguide structures, each waveguide structure having a substantially circular cross section.

4. The method of claim 1, wherein the polygonal silica pad is a rectangular or square silica pad.

5. The method of claim 1, wherein the substantially polygonal silica pad is defined through etching.

6. The method of claim 1, wherein the laser silica reflow process is performed by movement of the silica pad through a laser beam.

7. The method of claim 1, wherein the laser silica reflow process is performed by movement of a laser beam through the silica pad.

8. The method of claim 1, wherein the two waveguide structures extend along a curved path.

9. The method of claim 3, wherein the two separate waveguide structures are parallel to each other.

* * * * *